United States Patent
Buckley et al.

(10) Patent No.: US 12,347,084 B2
(45) Date of Patent: Jul. 1, 2025

(54) AUTOMATED OBJECT TRANSFORMATION IDENTIFICATION

(71) Applicant: Optum, Inc., Minnetonka, MN (US)

(72) Inventors: Gregory Buckley, Dublin (IE); David S. Monaghan, Dublin (IE); Johnathon E. Schultz, Cross Hill, SC (US); Ajay Ajit Maity, Letterkenny (IE)

(73) Assignee: Optum, Inc., Minnetonka, MN (US)

( * ) Notice: Subject to any disclaimer, the term of this patent is extended or adjusted under 35 U.S.C. 154(b) by 858 days.

(21) Appl. No.: 17/482,031

(22) Filed: Sep. 22, 2021

(65) Prior Publication Data

US 2023/0089756 A1    Mar. 23, 2023

(51) Int. Cl.
*G06T 7/00* (2017.01)
*G06F 18/2415* (2023.01)
(Continued)

(52) U.S. Cl.
CPC ........ *G06T 7/0002* (2013.01); *G06F 18/2415* (2023.01); *G06F 18/2431* (2023.01);
(Continued)

(58) Field of Classification Search
CPC ... G06T 7/0002; G06T 11/20; G06T 2210/12; G06T 19/00; G06F 18/2415;
(Continued)

(56) References Cited

U.S. PATENT DOCUMENTS 7,263,493 B1    8/2007  Provost et al.
8,934,709 B2 *  1/2015  Saptharishi .......... H04N 23/661
                                                       382/227

(Continued)

FOREIGN PATENT DOCUMENTS

EP    3318944 A2 *  5/2018  ......... G05B 23/0216
EP    3318945 A2 *  5/2018  ......... G05B 23/0216
IN    202311047898 A *  8/2023

OTHER PUBLICATIONS

"AI For Dental X-Ray Imaging and Voice Charting," Denti.AI, (6 pages), (article, online), [Retrieved from the Internet Nov. 5, 2021] <URL: https://new.denti.ai/>.

(Continued)

*Primary Examiner* — Charles T Shedrick
(74) *Attorney, Agent, or Firm* — Alston & Bird LLP

(57) ABSTRACT

Various embodiments provide methods, apparatus, systems, computing entities, and/or the like, identifying object transformations in images and determining a sufficiency measure for an image set in capturing object transformations for one or more objects. In an embodiment, an example method comprises receiving a transformation record data entity and an image set comprising a plurality of images, the transformation record data entity comprising one or more object identifiers. The method further comprises identifying each object depicted by each image using an object identification machine learning and determining a sufficiency measure for the image set based at least in part on determining a transformation state for each object associated with one of the one or more object identifiers using one or more transformation classification machine learning models. The method further includes performing one or more automated sufficiency-based actions, which includes automatically generating and transmitting a request for supplemental image(s).

15 Claims, 7 Drawing Sheets

(51) Int. Cl.
*G06F 18/2431* (2023.01)
*G06N 20/00* (2019.01)
*G06T 11/20* (2006.01)

(52) U.S. Cl.
CPC .............. *G06N 20/00* (2019.01); *G06T 11/20* (2013.01); *G06T 2210/12* (2013.01)

(58) Field of Classification Search
CPC .. G06F 18/2431; G06N 20/00; G06N 3/0464; G06N 3/09; G06V 10/761; G06V 10/82; G06V 10/25
See application file for complete search history.

(56) References Cited

U.S. PATENT DOCUMENTS

| | | | |
|---|---|---|---|
| 9,619,841 | B2 | 4/2017 | DiRienzo |
| 10,937,108 | B1 | 3/2021 | Tabak et al. |
| 10,937,160 | B1 | 3/2021 | Ricci et al. |
| 10,997,727 | B2 | 5/2021 | Xue et al. |
| 11,055,531 | B1* | 7/2021 | Maestas ................ G06V 20/20 |
| 12,033,104 | B2* | 7/2024 | Wolf ...................... G11B 27/28 |
| 2010/0179838 | A1 | 7/2010 | Basant et al. |
| 2015/0170002 | A1* | 6/2015 | Szegedy .............. G06V 30/194 382/156 |
| 2015/0170417 | A1* | 6/2015 | Palm ................... A63F 13/5375 345/633 |
| 2016/0132969 | A1 | 5/2016 | Gunjan et al. |
| 2016/0284128 | A1* | 9/2016 | Michalscheck .... G05B 23/0216 |
| 2020/0170710 | A1* | 6/2020 | Rus ....................... G16H 20/40 |
| 2020/0268349 | A1* | 8/2020 | Buras .................... A61B 8/0891 |
| 2020/0335208 | A1* | 10/2020 | Talmor .................. G16H 40/60 |
| 2020/0411167 | A1 | 12/2020 | Kearney et al. |
| 2021/0142885 | A1 | 5/2021 | Ricci et al. |
| 2021/0346093 | A1* | 11/2021 | Redmond .............. A61B 34/20 |
| 2022/0284603 | A1* | 9/2022 | Fournier ................ G16H 30/20 |
| 2023/0091778 | A1* | 3/2023 | Nguyen ................ G05B 19/418 345/633 |
| 2023/0092938 | A1* | 3/2023 | Nguyen ........... G05B 19/41885 700/56 |
| 2023/0093660 | A1* | 3/2023 | Nguyen .................. G06F 3/016 345/633 |
| 2023/0306502 | A1* | 9/2023 | Baker, Jr. .......... G06F 16/24573 |
| 2024/0037945 | A1* | 2/2024 | Torabi ................... G16H 50/70 |

OTHER PUBLICATIONS

"Improving The Quality of Dental Care With The Power Of AI," ORCA Dental AI, (4 pages), (article, online), [Retrieved from the Internet Nov. 5, 2021] <URL: https://www.orca-ai.com/>.

Bhardwaj, Akashdeep et al. "Health Insurance Claim Prediction Using Artificial Neural Networks," International Journal of System Dynamics Applications, vol. 9, Issue 3, Jul. 1, 2020, pp. 40-57, available online https://www.researchgate.net/publication/342605306_Health_Insurance_Claim_Prediction_Using_Artificial_Neural_Networks/ link/5fc7957a92851c00f8453f67/download.

Chen, Hu et al. "A Deep Learning Approach To Automatic Teeth Detection and Numbering Based On Object Detection In Dental Periapical Films," Scientific Reports, vol. 9, No. 3840, Mar. 7, 2019, pp. 1-11, DOI: 10.1038/s41598-019-40414-y.

* cited by examiner

506

| Object Identifier | Pre-Transformation | Post-Transformation |
|---|---|---|
| #1 | NOT FOUND | Present |
| #2 | Present | Present |
| #3 | Present | Present |
| #4 | Present | NOT FOUND |

AUTOMATED OBJECT TRANSFORMATION IDENTIFICATION

BACKGROUND

Various embodiments of the present disclosure address technical challenges related to identifying object transformations captured by images of an image set and determining whether the image set sufficiently captures one or more particular object transformations.

BRIEF SUMMARY

In general, embodiments of the present disclosure provide methods, apparatus, systems, computing devices, computing entities, and/or the like for identifying object transformations captured by images of an image set and for determining whether the image set sufficiently captures one or more particular object transformations. An object transformation transforms an object and is sufficiently captured if the image set depicts at least one object not yet transformed by the transformation (e.g., a pre-transformation state) and at least one object having been transformed by the transformation (e.g., a post-transformation state). An overall sufficiency measure for the image set is determined according to whether the image set sufficiently captures one or more object transformations indicated by a transformation record.

Various embodiments implement an object identification machine learning model and one or more transformation classification machine learning models to identify object transformations and to determine an overall sufficiency measure for the image set according to the transformation record. The object identification machine learning model is configured and used to determine and identify particular objects depicted by the image set, such as objects transformed by the one or more object transformations indicated by the transformation record. One or more transformation classification machine learning models a configured and used to determine a transformation state of an object, such as whether the object has been transformed via a particular object transformation. Use of the object identification machine learning model and the one or more transformation classification machine learning models enables accurate and efficient identification of object transformations and provides further advantages in determining a sufficiency measure for the image set.

In accordance with one aspect, a computer-implemented method is provided. The method includes receiving a transformation record data entity and an image set including a plurality of images. The transformation record data entity describes one or more transformations for one or more object identifiers. The method further includes determining, based at least in part on the transformation record data entity and the image set and by using an object identification machine learning model, a plurality of objects depicted by the image set. Each object is associated with an object identifier of one or more object identifiers described by the transformation record data entity. The method further includes, for each object and using one or more transformation classification machine learning models, a transformation state for the object. The method further includes determining a sufficiency measure for the image set based at least in part on comparing, for each object identifier described by the transformation record data entity, the transformation for the object identifier and each transformation state for one or more related objects of the plurality of objects that are associated with the object identifier. The method further includes performing one or more automated sufficiency-based actions based at least in part on the sufficiency measure.

In accordance with another aspect, a computer program product is provided. The computer program product may include at least one computer-readable storage medium having computer-readable program code portions stored therein, the computer-readable program code portions including executable portions configured to cause at least one processor to receive a transformation record data entity and an image set including a plurality of images. The transformation record data entity describes one or more transformations for one or more object identifiers. The executable portions are further configured to cause at least one processor to determine, based at least in part on the transformation record data entity and the image set and by using an object identification machine learning model, a plurality of objects depicted by the image set. Each object is associated with an object identifier of one or more object identifiers described by the transformation record data entity. The executable portions are further configured to cause at least one processor to, for each object, determine a transformation state for the object using one or more transformation classification machine learning models. The executable portions are further configured to cause at least one processor to determine a sufficiency measure for the image set based at least in part on comparing, for each object identifier described by the transformation record data entity, the transformation for the object identifier and each transformation state for one or more related objects of the plurality of objects that are associated with the object identifier. The executable portions are further configured to cause the at least one processor to perform one or more automated sufficiency-based actions based at least in part on the sufficiency measure.

In accordance with yet another aspect, an apparatus including a processor and at least one memory including computer program code is provided. In various embodiments, the at least one memory and the computer program code are configured to, with the processor, cause the apparatus to receive a transformation record data entity and an image set including a plurality of images. The transformation record data entity describes one or more transformations for one or more object identifiers. The at least one memory and the computer program code are further configured to, with the processor, cause the apparatus to determine, based at least in part on the transformation record data entity and the image set and by using an object identification machine learning model, a plurality of objects depicted by the image set. Each object is associated with an object identifier of one or more object identifiers described by the transformation record data entity. The at least one memory and the computer program code are further configured to, with the processor, cause the apparatus to, for each object, determine a transformation state for the object using one or more transformation classification machine learning models. The at least one memory and the computer program code are further configured to, with the processor, cause the apparatus to determine a sufficiency measure for the image set based at least in part on comparing, for each object identifier described by the transformation record data entity, the transformation for the object identifier and each transformation state for one or more related objects of the plurality of objects that are associated with the object identifier. The at least one memory and the computer program code are further configured to, with the processor, cause the apparatus to perform one or more automated sufficiency-based actions based at least in part on the sufficiency measure.

BRIEF DESCRIPTION OF THE DRAWINGS

Having thus described the invention in general terms, reference will now be made to the accompanying drawings, which are not necessarily drawn to scale.

Figure 1:
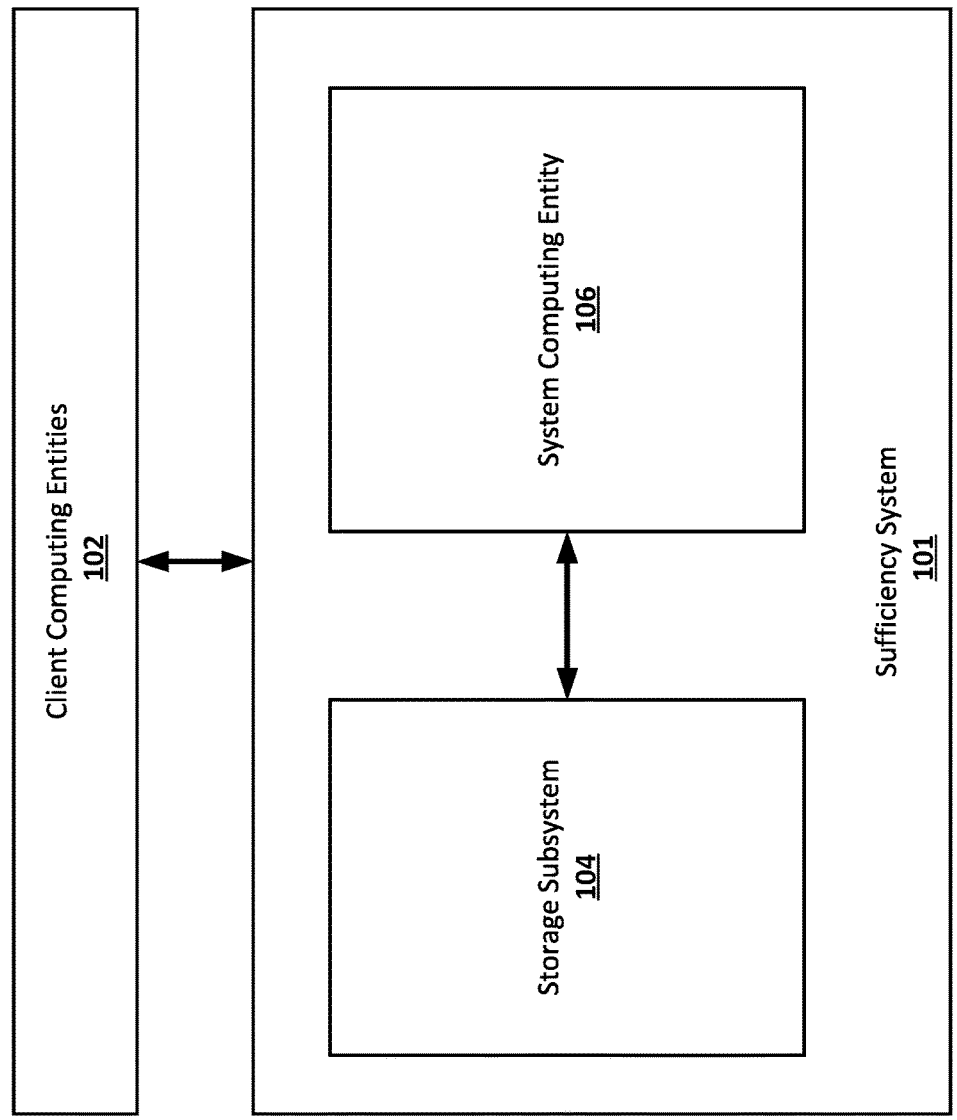

FIG. 1 provides an exemplary overview of an architecture that may be used to practice embodiments of the present disclosure.

Figure 2:
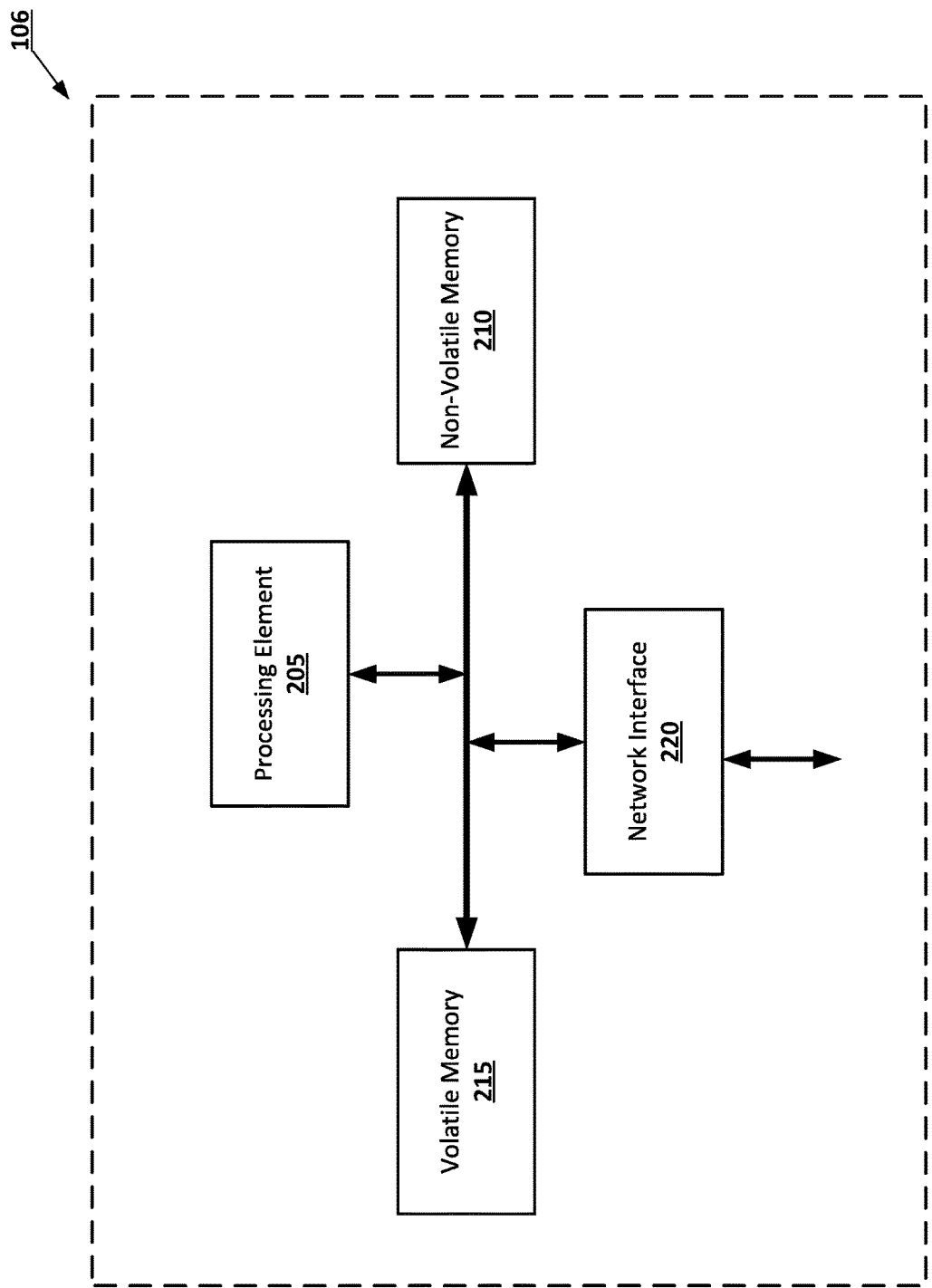

FIG. 2 provides a diagram of an example system computing entity, in accordance with some embodiments discussed herein.

Figure 3:
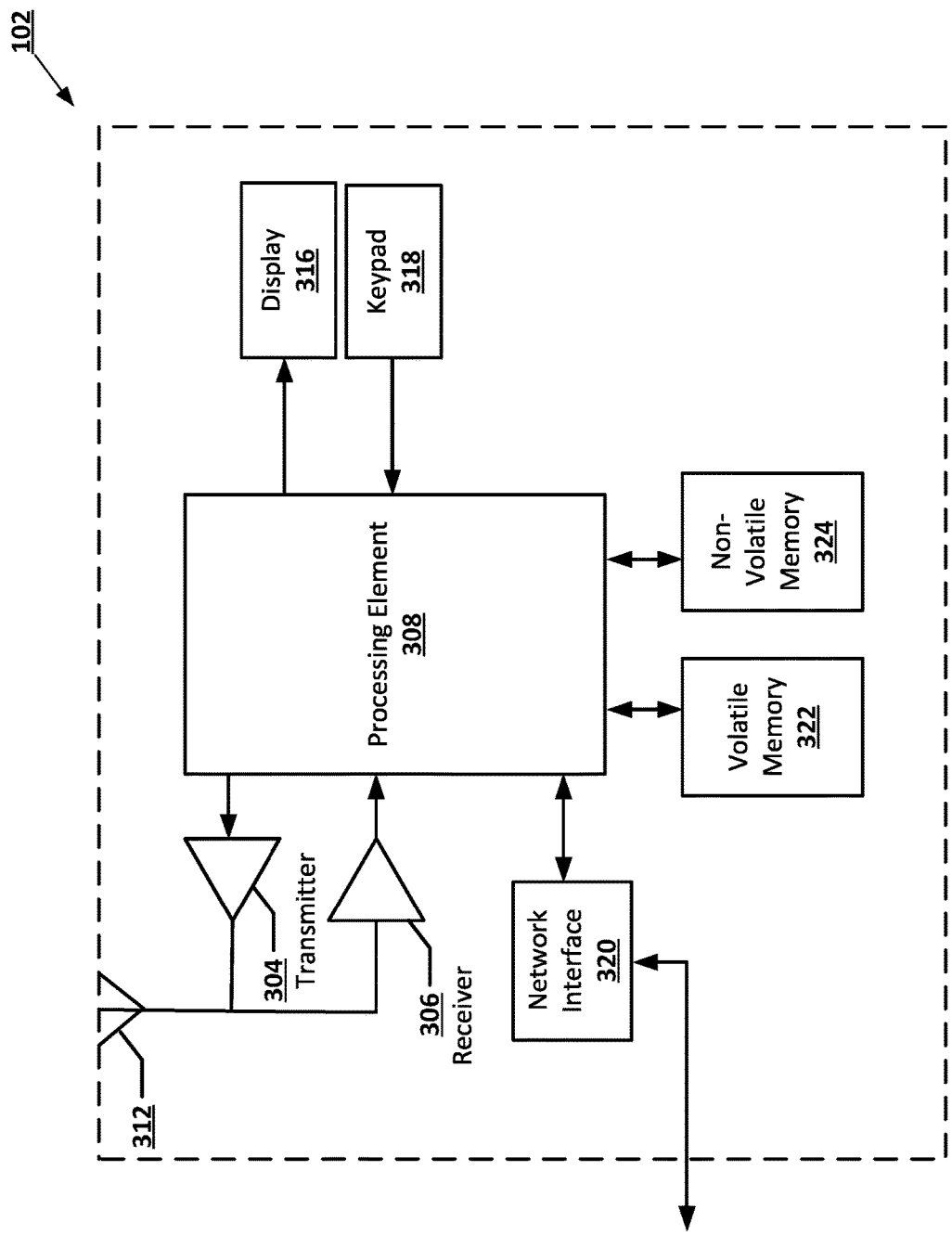

FIG. 3 provides a diagram of an example client computing entity, in accordance with some embodiments discussed herein.

Figure 4:
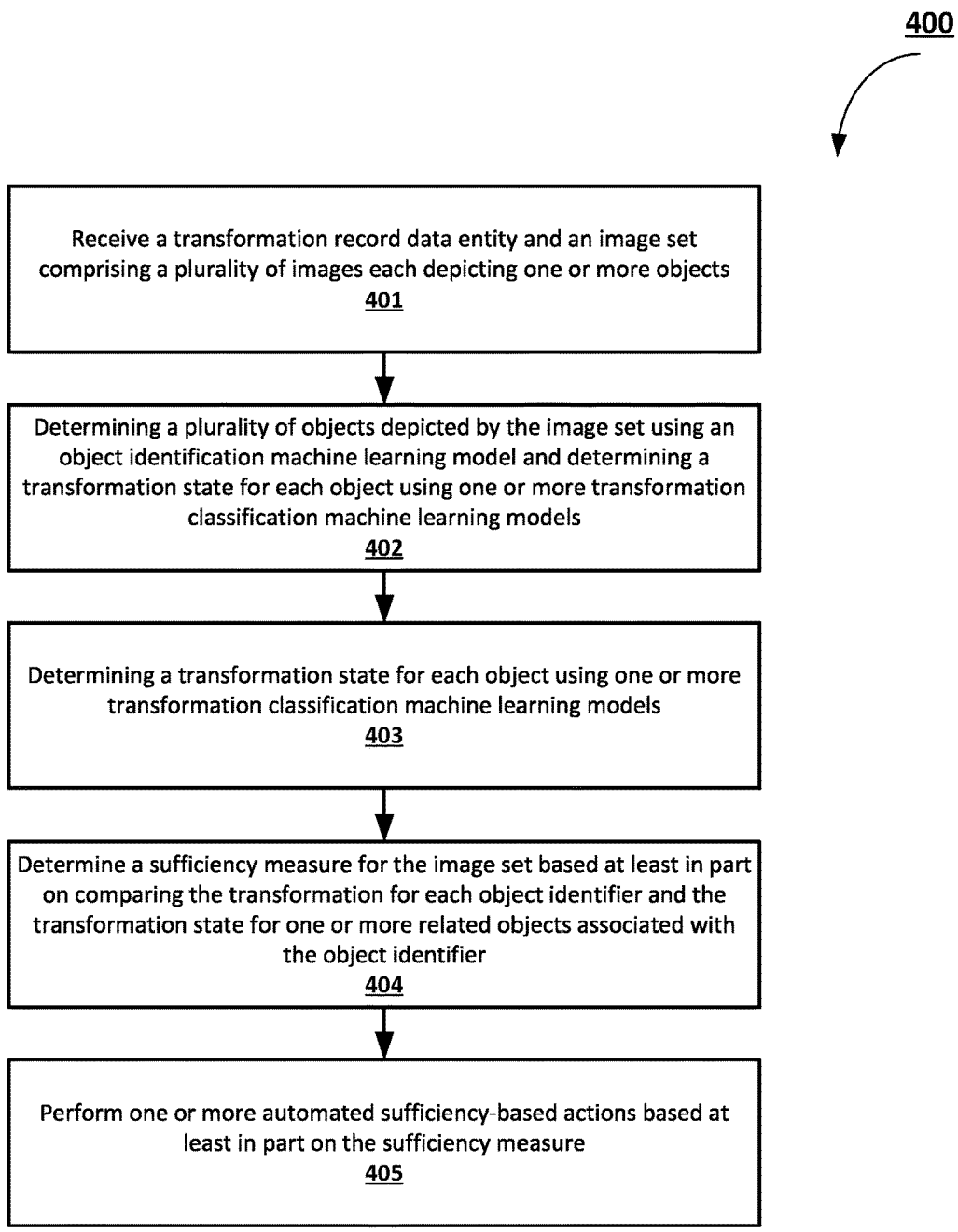

FIG. 4 provides a flowchart diagram of an example process for identifying object transformations and determining a sufficiency measure for an image set, in accordance with some embodiments discussed herein.

Figure 5:
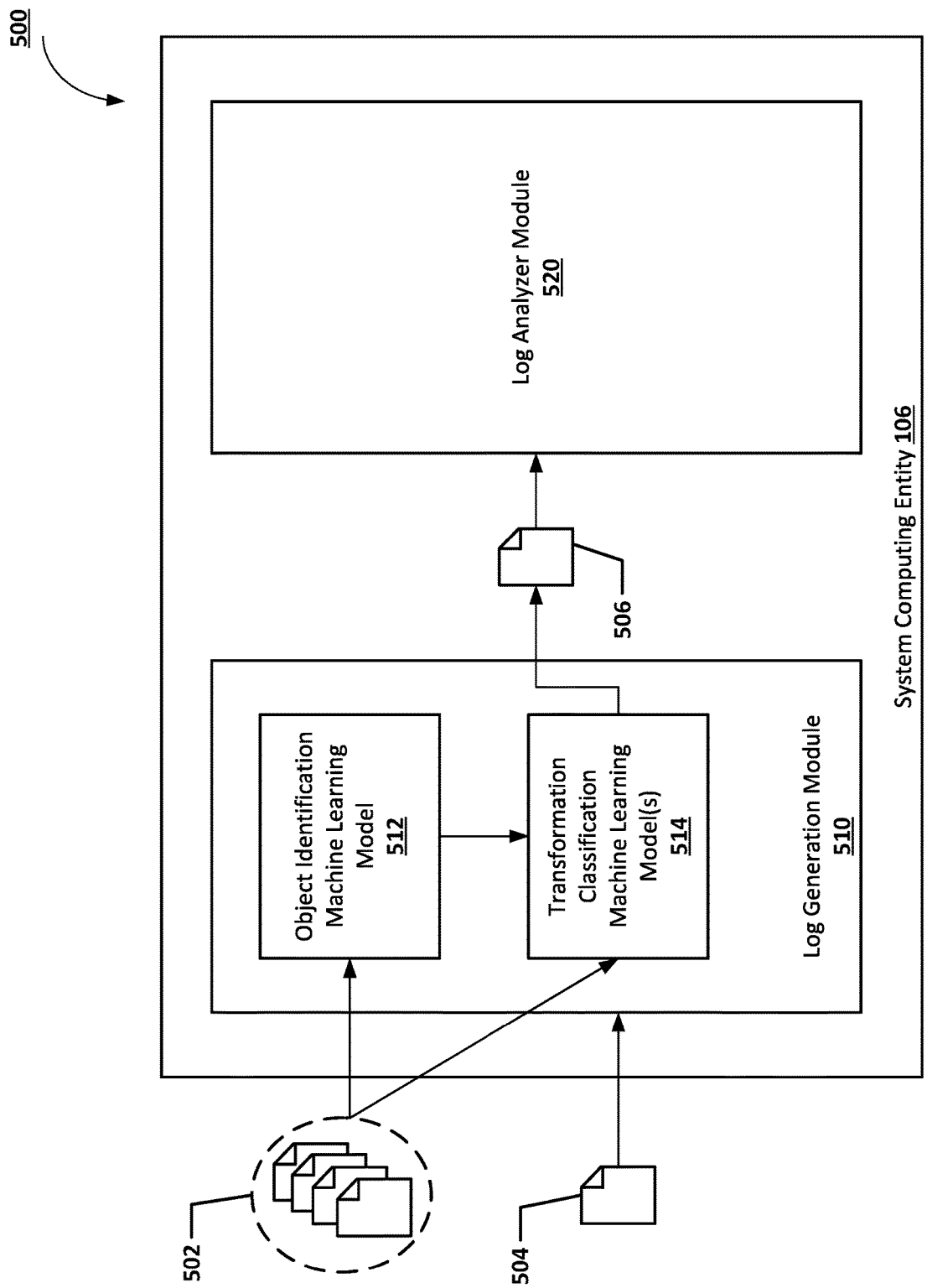

FIG. 5 illustrates an example block diagram of a system computing entity configured to identify object transformations and determine a sufficiency measure for an image set, in accordance with some embodiments discussed herein.

Figure 6:
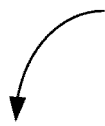

FIG. 6 illustrates an example object state log data entity used in determining a sufficiency measure for an image set, in accordance with some embodiments discussed herein.

Figure 7:
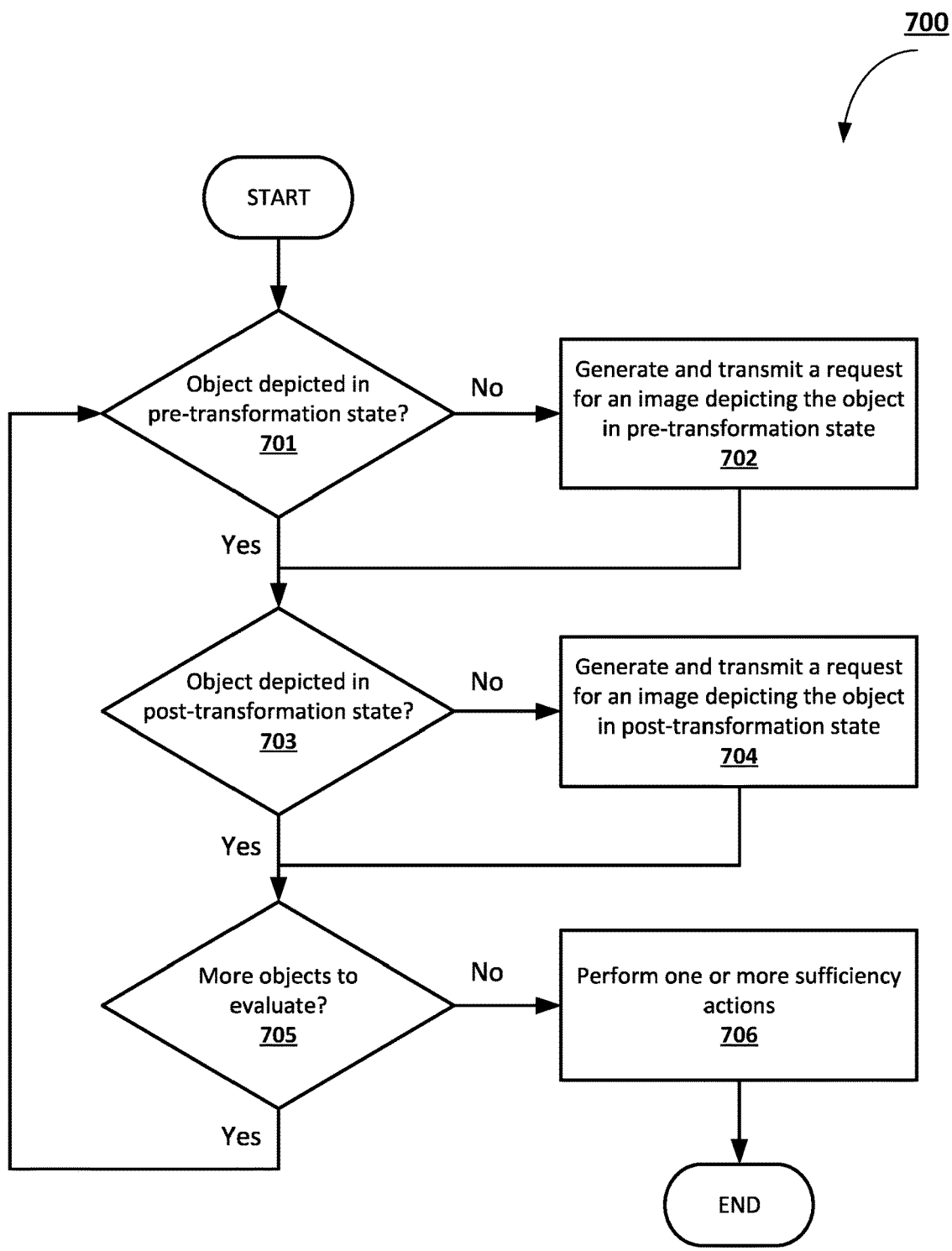

FIG. 7 provides a flowchart diagram of an example process for performing automated sufficiency-based actions based at least in part on a sufficiency measure, in accordance with some embodiments discussed herein.

DETAILED DESCRIPTION

Various embodiments of the present disclosure now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to providing text-based summarizations of conversations, one of ordinary skill in the art will recognize that the disclosed concepts can be used in other summarization and/or text extraction applications.

I. General Overview and Technical Improvements

Various embodiments of the present invention address technical challenges related to improving efficiency of distributed record keeping systems. Many distributed record keeping systems require a first set of computing entities to provide specific records to a second set of computing entities. In such distributed record keeping systems, transmission of non-compliant and/or insufficient data records can cause substantial waste of network resources and processing resources. For example, in one scenario, a recipient computing entity may then transmit non-compliant data to other computing entities, and/or use the non-compliant data as part of complex processing tasks, all of which will lead to inefficient and unreliable use of system resources. By providing techniques for more reliable detection of non-compliant and/or insufficient data records, various embodiments of the present invention address technical challenges related to improving efficiency of distributed record keeping systems and make important technical contributions to the fields of distributed data processing and distributed computing.

Moreover, various embodiments of the present disclosure are generally directed to identifying object transformations captured by images of an image set. Identified object transformations may be used to determine a sufficiency measure for the image set, or a degree to which the image set captures one or more particular object transformations. Various embodiments for determining a sufficiency measure for the image set begins with receiving a transformation record data entity associated with the image set. The transformation record data entity describes one or more object identifiers and one or more transformations. In various instances, an object identifier described by the transformation record data entity is associated with a transformation described by the transformation record data entity. In various embodiments, an object identification machine learning model is used to identify depictions of the specific objects within the image set, and one or more transformation classification machine learning models are used to determine a transformation state of each depiction of the specific objects. In various embodiments, the determined transformation states of each depiction are recorded in an object state log data entity.

Based at least in part on the determined transformation states using the one or more transformation classification machine learning models, a sufficiency measure for the image set is determined using the object state log data entity, and automated sufficiency-based actions may be performed. Specifically, for each object identifier, at least one object relating to and associated with the object identifier is required to be depicted in a pre-transformation state of the associated transformation and at least on object relating to and associated with the object identifier is required to be depicted in a post-transformation state of the associated transformation. Responsive to at least one such depiction being absent from the image set, a request for at least one supplemental image depicting an object in and/or characteristic of the absent transformation state is automatically generated and transmitted.

In one exemplary application, various embodiments directed to identifying object transformations captured by images of an image set and to determining a sufficiency measure for the image set in capturing one or more particular transformations are used with an image set comprising a plurality of dental X-ray images and a dental claim (e.g., the transformation record data entity). Specifically, the dental claim describes one or more teeth and one or more dental procedures performed on the teeth. A sufficiency measure for the image set based at least in part on whether the image set depicts both a pre-transformation state and a post-transformation state for each tooth described by the dental claim, is determined. If none of the teeth are associated with a pre-transformation state and/or a post-transformation state, a request for a supplemental dental X-ray image depicting the pre-transformation state and/or the post-transformation state is automatically generated and transmitted.

Thus, various embodiments of the present disclosure provide various technical advantages to technical challenges. In particular, various embodiments train and use machine learning models in order to accurately and efficiently identify objects depicted by the image set and to accurately and efficiently determine transformation states for the objects. Further, various embodiments enable the automated identification of objects, reducing time and resources spent for manual identification of objects and manual determination of transformation states. Automation of such tasks reduce network bandwidth and traffic, time, and processing resources spent on determining and communicating sufficiency measures of image sets.

II. Exemplary Definitions of Certain Terms

The term "transformation state" may refer to a data entity configured to characterize an object depicted by an image with respect to a defined transformation. In particular, the object may be characterized in a pre-transformation state or a post-transformation state. The pre-transformation state and the post-transformation state are specific to a particular transformation. For an example transformation of a dental crown procedure, a tooth without a dental crown has a pre-transformation state for the dental crown procedure but may have been transformed via other dental procedures. That is, an object in a pre-transformation state for a first transformation may be in a post-transformation state for a second transformation. Post-transformation states of an object are transformation-specific, and an object may be in multiple post-transformation states for multiple transformations. In various embodiments, transformation states for an object are determined using one or more transformation classification machine learning models. In various embodiments, a transformation state is a data value, a data object, an embedding, and/or the like.

The term "transformation classification machine learning model" may refer to a data entity configured to determine and output at least one transformation state of an object depicted by an input image. The transformation classification machine learning model is configured to examine object characteristics and features and to generate a probability of such object characteristics and features being indicative of a transformation. In an example application, the transformation classification machine learning model determines if and/or what dental procedures have been performed on a tooth depicted by a dental X-ray image. In some embodiments, the transformation classification machine learning model outputs a plurality of probabilities each describing a likelihood of the object being transformed by a corresponding transformation. In some other embodiments, a plurality of transformation classification machine learning models each corresponding to a transformation are used. For a particular transformation, a low probability of the object being transformed is used to determine a pre-transformation state for the object for the particular transformation, while a high probability of the object being transformed is used to determine a post-transformation state for the object for the particular transformation. In various embodiments, the transformation classification machine learning model comprises a convolutional neural network (CNN) model (e.g., a VGG16 CNN architecture). The transformation classification machine learning model is configured (e.g., trained) by providing labelled images that include images with objects being transformed via different transformations, the different transformations being labelled. In some embodiments, each labelled image depicts only one object. Similarly, the input image provided to the transformation classification machine learning model is a portion or a crop of a larger image and depicts one object.

The term "object identification machine learning model" may refer to a data entity configured to output a predicted object identifier for each object depicted by an input image. The object identification machine learning model is configured to examine object characteristics and features and to generate a predicted object identifier (e.g., a classification) for the object. In an example application, the object identification machine learning model outputs predicted teeth numbers for each tooth depicted by a dental X-ray image (e.g., tooth number 12 for the upper first bicuspid, tooth number 23 for a lower lateral incisor). The object identification machine learning model is further configured to locate each object depicted by the input image and to indicate the location of each object within the input image via a bounding box. In various embodiments, the object identification machine learning model comprises a region-based convolutional neural network (RCNN) configured for object detection and/or a You-Only-Look-Once (YOLO) algorithm. The object identification machine learning model is configured (e.g., trained) by providing labelled images that include images with objects labelled with corresponding object identifier and corresponding bounding boxes.

The term "bounding box" may refer to a data entity configured to indicate a location of an object within an image (e.g., a portion of the image that depicts the object in its entirety). An image may depict multiple objects, and each object is depicted by different portions of the image. In various embodiments, the bounding box is coordinate-based with respect to the dimensions and size of the image. For example, the bounding box comprises two pixel coordinates of an image that define a box (e.g., one defining an upper left corner and one defining a lower right corner) within which an object is depicted in its entirety. The object identification machine learning model is configured to generate a bounding box for each identified object. In various embodiments, a bounding box is a data object, a data structure, an array, a vector, a matrix, and/or the like.

The term "transformation record data entity" may refer to a data entity configured to describe one or more object identifiers (e.g., tooth types) and a transformation for each object identifier. In various embodiments, the transformation record data entity comprises one or more object identifiers identifying objects that have been transformed and describes an associated object transformation for each object identifier. A sufficiency measure for an image set is determined with respect to the object identifiers and associated object transformations described by the transformation record data entity. A transformation record data entity and an image set are associated, and a sufficient image set captures each object described by the associated transformation record data entity in a pre-transformation state of the associated object transformation and in a post-transformation state of the associated object transformation. In various embodiments, the transformation record data entity and the associated image set are received via an application programming interface (API) request, call, query, and/or the like.

The term "object state log data entity" may describe a data entity configured to describe the transformation states of objects depicted by an image set. Specifically, the object state log data entity describes objects depicted by an image set that are related to an object identifier described a transformation record data entity associated with the image set. For each object identifier, the object state log data entity indicates whether at least one related object is associated with (e.g., is depicted in) a pre-transformation state of the transformation associated with the object identifier (e.g., as described by the transformation record data entity) and further indicates whether at least one related object is associated with a post-transformation state of the same transformation. Thus, the object state log data entity is generated and/or updated based at least in part on the determination of transformation states using the transformation classification machine learning model. Using the object state log data entity, a sufficiency measure for the image set is determined and one or more automated sufficiency-based actions may be performed. In various embodiments, the object state log data entity is a data structure, a data object, a matrix, an array, a table, a graph, a knowledge graph, and/or the like.

III. Computer Program Products, Methods, and Computing Entities

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIIVIM), single in-line memory module (SWIM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is a schematic diagram of an example system architecture 100 for identifying object transformations captured by images of an image set and for determining a sufficiency measure for the image set with respect to a transformation record data entity associated with the image set. For example, the system architecture 100 may be used to determine whether the image set sufficiently captures one or more particular object transformations described by the transformation record data entity associated with the image set and to perform one or more automated sufficiency-based actions, such as to cure any insufficiencies of the image set.

The system architecture 100 includes a sufficiency system 101 configured to configure (e.g., train) and use an object identification machine learning model to determine (e.g., identify) objects depicted by the image set, to configure (e.g., train) and use one or more transformation classification machine learning models to determine transformation states of the identified objects, to determine whether each object described by the transformation record data entity is depicted in a pre-transformation state or a post-transformation state of an associated object transformation, and to perform one or more automated sufficiency-based actions. In various embodiments, the sufficiency system 101 comprises a system computing entity 106 configured to communicate with one or more client computing entities 102. The system computing entity 106 receives an image set and a transformation record data entity, determines a sufficiency measure for the image set using the object identification machine learning model and the transformation classification machine learning model, and indicates the determined sufficiency measure to the one or more client computing entities 102. The system computing entity 106 is configured to perform one or more automated sufficiency-based actions based at least in part on the sufficiency measure, including automatically generating and transmitting a request for a supplemental image depicting an object in a pre-transformation state and/or the object in a post-transformation state.

The sufficiency system 101 further comprises a storage subsystem 104 for storing one or more object identification machine learning models, one or more transformation classification machine learning models, one or more object state log data entities, and/or other data used for identifying object transformations captured by an image set and determining a sufficiency measure for the image set. The storage subsystem 104 may include one or more storage units, such as multiple distributed storage units that are connected through a computer network. Each storage unit in the storage subsystem 104 may store at least one of one or more data assets and/or one or more data about the computed properties of one or more data assets. Moreover, each storage unit in the storage subsystem 104 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

In some embodiments, the sufficiency system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). In various embodiments, the system computing entity 106 receives an image set and a transformation record data entity from a client computing entity 102, determines a sufficiency measure for the image set with respect to the transformation record data entity, and provides an indication of the determined sufficiency measure to the client computing entity 102. In various embodiments, a client computing entity 102 provides the image set and the transformation record data entity to the system computing entity 106 via an API request, query, call, and/or the like, and the system computing entity 106 responds with an API response with an indication of the determined sufficiency measure for the image set and/or a request for supplemental images to cure any insufficiencies of the image set.

Exemplary Computing Entities

In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

FIG. 2 provides a schematic of a system computing entity 106, according to one embodiment of the present disclosure. As shown in FIG. 2, in one embodiment, the system computing entity 106 may include, or be in communication with, one or more processing elements 205 (also referred to as processors, processing circuitry, and/or similar terms used herein interchangeably) that communicate with other elements within the system computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the system computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media 210 may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the system computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media 215 may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the system computing entity 106 with the assistance of the processing element 205 and operating system.

As indicated, in one embodiment, the system computing entity 106 may also include one or more network interfaces 220 for communicating with various computing entities (e.g., one or more other system computing entities 106, one or more client computing entities 102), such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the system computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the system computing entity 106 may include, or be in communication with, one or more input elements, such as a keyboard input, a mouse input, a touch screen/display input, motion input, movement input, audio input, pointing device input, joystick input, keypad input, and/or the like. The system computing entity 106 may also include, or be in communication with, one or more output elements (not shown), such as audio output, video output, screen/display output, motion output, movement output, and/or the like.

FIG. 3 provides a schematic of an example client computing entity 102 that may be used in conjunction with embodiments of the present disclosure. Client computing entities 102 can be operated by various parties, and the system architecture 100 may include one or more client computing entities 102. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the system computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the system computing entity 106 via a network interface 320.

Via these communication standards and protocols, the client computing entity 102 can communicate with various other entities (e.g., system computing entities 106, storage subsystem 104) using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the system computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the system computing entity 106, various other computing entities, and/or a storage subsystem 104.

In another embodiment, the client computing entity 102 may include one or more components or functionality that are the same or similar to those of the system computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. Exemplary System Operations

As discussed below, various embodiments of the present invention address technical challenges related to improving efficiency of distributed record keeping systems. Many distributed record keeping systems require a first set of computing entities to provide specific records to a second set of computing entities. In such distributed record keeping systems, transmission of non-compliant and/or insufficient data records can cause substantial waste of network resources and processing resources. For example, in one scenario, a recipient computing entity may then transmit non-compliant data to other computing entities, and/or use the non-compliant data as part of complex processing tasks, all of which will lead to inefficient and unreliable use of system resources. By providing techniques for more reliable detection of non-compliant and/or insufficient data records, various embodiments of the present invention address technical challenges related to improving efficiency of distributed record keeping systems and make important technical contributions to the fields of distributed data processing and distributed computing.

Various embodiments of the present disclosure provide various technical advantages to technical challenges. In particular, various embodiments train and use machine learning models in order to accurately and efficiently identify objects depicted by the image set and to accurately and efficiently determine transformation states for the objects. Further, various embodiments enable the automated identification of objects, reducing time and resources spent for manual identification of objects and manual determination of transformation states. Automation of such tasks reduce network bandwidth and traffic, time, and processing resources spent on determining and communicating sufficiency measures for image sets.

FIG. 4 provides a flowchart diagram of an example process 400 for identifying object transformations captured by images of an image set and for determining whether the image set sufficiently captures one or more particular object transformations described by a transformation record data entity. In various embodiments, the system computing entity 106 comprises means, such as one or more processing elements 205, memories 210, 215, network interface 220, and/or the like for identifying object transformations and determining a sufficiency measure for an image set. For example, the system computing entity 106 comprises means for performing the steps/operations of process 400.

In an example embodiments, the process 400 begins with and/or is triggered by step/operation 401. Step/operation 401 includes receiving a transformation record data entity and an image set comprising a plurality of images each depicting one or more objects. In various embodiments, the transformation record data entity and the image set are received via an API request, call, query, and/or the like. For example, the system computing entity 106 comprises a sufficiency API via which requests to determine a sufficiency measure for an image set with respect to a transformation record data entity are received and via which an indication of a determined sufficiency measure is provided. In one example application, the transformation record data entity is a dental claim and/or record for a patient, and the image set comprising a plurality of dental X-ray images each depicting one or more teeth of the patient.

The transformation record data entity describes one or more object identifiers (e.g., teeth) that have been transformed and one or more object transformations by which the one or more object identifiers have been transformed. In various embodiments, the transformation record data entity describes an associated object transformation for each object identifier. A sufficiency measure for an image set is determined with respect to the object identifiers and associated object transformations described by the transformation record data entity. A transformation record data entity and an image set are associated, and a sufficient image set depicts at least one object of each object identifier described by the associated transformation record data entity in a pre-transformation state of the associated object transformation and at least one object of each object identifier in a post-transformation state of the associated object transformation.

Turning now to FIG. 5, a block diagram 500 of the system computing entity 106 is provided. FIG. 5 illustrates an image set 502 comprising a plurality of images and a transformation record data entity 504 both being received by the system computing entity 106. In various embodiments, the image set 502 and the transformation record data entity 504 are received at a log generation module 510 of the system computing entity 106, at which objects depicted by the image set 502 are determined/identified and transformation states of each identified object are determined. Specifically, the image set 502 is received and provided to an object identification machine learning model 512 configured to determine (e.g., identify) objects depicted by the image set 502.

Returning to FIG. 4, the process 400 comprises step/operation 402, which comprises determining a plurality of objects depicted by the image set using an object identification machine learning model. Each of the plurality of objects is associated with an object identifier of one or more object identifiers described by the transformation record data entity 504. Specifically, each object depicted by each image of the image set is identified. In various embodiments, one image of the image set is provided to the object identification machine learning model 512 at a time, and the object identification machine learning model 512 may analyze each image of the image set iteratively. Each image when provided to the object identification machine learning model 512 is processed, such as by resizing the image via padding, for example. In various embodiments, the object identification machine learning model 512 is configured to receive images of a standard input size/shape/dimension.

In various embodiments, determining and identifying an object depicted by an image of the image set comprises generating a predicted object identifier for the object, and the object identification machine learning model 512 is configured to output a predicted object identifier for each object depicted by the image. The object identification machine learning model 512 is configured to examine object characteristics and features and to generate the predicted object identifier for the object. In an example application, the object identification machine learning model 512 outputs predicted teeth numbers for each tooth depicted by a dental X-ray image (e.g., tooth number 12 for the upper first bicuspid, tooth number 23 for a lower lateral incisor). The object identification machine learning model 512 is trained to generate a predicted object identifier for an object based at least in part on being provided with images depicting objects each labelled with an object identifier (e.g., labelled images, a labelled image set).

Determining an object depicted by an image of the image set further comprises locating and indicating the location of the object within the image, and the object identification machine learning model is further configured to locate each object depicted by the image and to indicate the location of each object within the image via a bounding box. The bounding box is configured to indicate a location of a corresponding object depicted by the image, or specifically a portion of the image that depicts the corresponding object in its entirety. In various embodiments, the bounding box is coordinate-based with respect to the dimensions and size of the image. For example, the bounding box comprises two pixel coordinates of an image that define a box (e.g., one defining an upper left corner and one defining a lower right corner) within which an object is depicted in its entirety. The object identification machine learning model 512 is trained to generate a bounding box for an object based at least in part on being provided with images depicting objects each indicated with a bounding box.

In various embodiments, the object identification machine learning model 512 is trained to generate a predicted object identifier and a bounding box for each object based at least in part on being provided with a labelled image set comprising images depicting objects each labelled with an object identifier and indicated with a bounding box. In various embodiments, the object identification machine learning model 512 comprises a region-based convolutional neural network (RCNN) configured for object detection and/or a You-Only-Look-Once (YOLO) algorithm. The object identification machine learning model 512 may comprise any other suitable object detection mechanism or algorithm.

Thus, the object identification machine learning model 512 outputs a predicted object identifier and a bounding box for each object depicted by images of the image set 502. In FIG. 5, block diagram 500 illustrates the output of the object identification machine learning model 512 being provided to the transformation classification machine learning model 514. In various embodiments, the transformation classification machine learning model 514 is configured to determine transformation states of objects depicted by the image set 502 and in doing so, uses the output of the object identification machine learning model 512 that identifies and indicates a location of each object depicted by the image set 502.

In FIG. 4, process 400 further comprises step/operation 403. Step/operation 403 comprises determining a transformation state of each object depicted by the image set 502 using one or more transformation classification machine learning models 514. As previously discussed, a sufficiency measure for the image set 502 is determined based at least in part on whether the image set 502 sufficiently captures one or more particular object transformations for one or more object identifiers described by the transformation record data entity 504. An object transformation associated with an object identifier is sufficiently captured if at least one object related to the object identifier is associated with the pre-transformation state of the object transformation and if at least one related object is associated with the post-transformation state of the object transformation. Thus, determination of a sufficiency measure for the image set 502 involves determining the transformation states of objects depicted by the image set 502 and described by the transformation record data entity 504. It will be appreciated then that not all objects depicted by images of the image set 502 may be examined and evaluated.

In some embodiments, by performing step/operation 403, various embodiments of the present invention address technical challenges related to improving efficiency of distributed record keeping systems. Many distributed record keeping systems require a first set of computing entities to provide specific records to a second set of computing entities. In such distributed record keeping systems, transmission of non-compliant and/or insufficient data records can cause substantial waste of network resources and processing resources. For example, in one scenario, a recipient computing entity may then transmit non-compliant data to other computing entities, and/or use the non-compliant data as part of complex processing tasks, all of which will lead to inefficient and unreliable use of system resources. By providing techniques for more reliable detection of non-compliant and/or insufficient data records, various embodiments of the present invention address technical challenges related to improving efficiency of distributed record keeping systems and make important technical contributions to the fields of distributed data processing and distributed computing.

Accordingly, in various embodiments, each predicted object identifier generated by the object identification machine learning model 512 is compared with the one or more object identifiers described by the transformation record data entity 504. For example, the log generation module 510 determines whether a predicted object identifier matches or is substantially similar to an object identifier described by the transformation record data entity 504. If a predicted object identifier matches a described object identifier, then an image of the image set 502 within which the predicted object identifier identifies an object is provided to the transformation classification machine learning model 514 along with the bounding box associated with the object and generated by the object identification machine learning model 512 in order to determine the transformation state of the object identified by the predicted object identifier (e.g., and relating to an object identifier described by the transformation record data entity 504). Thus, as shown in FIG. 5, an image of the image set 502 and a bounding box generated by the object identification machine learning model 512 are provided to the transformation classification machine learning model 514.

The transformation classification machine learning model 514 is configured to determine and output a transformation state of an object depicted by an image and indicated by a bounding box. In various embodiments, the image provided to the transformation classification machine learning model 514 is processed and cropped to the bounding box, such that other objects depicted by the image are not provided to the transformation classification machine learning model 514 concurrently.

Using the cropped image depicting the object, the transformation classification machine learning model 514 generates a probability of the object being transformed by a transformation. Specifically, the probability is generated based at least in part on examining object characteristics and features that are indicative of the transformation transforming the object. In an example application, the transformation classification machine learning model 514 generates a probability of a tooth being transformed by a dental crown procedure based at least in part on whether a crown on the tooth is detected, for example. In various embodiments, the transformation classification machine learning model 514 is configured (e.g., trained) to generate a probability of a transformation being present (e.g., the transformation having transformed the object) based at least in part on being provided with images depicting objects having been transformed by different transformations and labelled with a corresponding transformation. To prevent overfitting, images depicting object that are untransformed are also provided to the transformation classification machine learning model 514. The transformation classification machine learning model then learns particular object characteristics and features captured by the labelled images and is configured to generate probabilities of transformations being present.

In various embodiments, the transformation classification machine learning model 514 is configured to generate one or more probabilities each associated with a transformation. That is, the transformation classification machine learning model 514 is trained on multiple transformations and is configured to output a probability of each transformation being present. Advantageously then, the transformation classification machine learning model 514 is configured to detect multiple transformations being present in an object, for example.

In some embodiments, multiple transformation classification machine learning models 514 are used to determine the transformation state of the object depicted by the cropped image. Each of the multiple transformation classification machine learning models 514 is specifically trained to generate a probability of a particular transformation being present or not. Thus, each transformation classification machine learning model 514 corresponds to one transformation, in some embodiments. Each transformation classification machine learning model 514 is provided with the cropped image, and each generates a probability of the corresponding transformation being present. As each transformation classification machine learning model 514 is individually trained to generate a probability of a particular transformation, each transformation classification machine learning model 514 may generate a more accurate prediction (e.g., probability) of the particular transformation being present, compared to the previously described "multi-class" transformation classification machine learning model 514 trained on multiple transformations.

In further embodiments, a specific transformation classification machine learning model 514 is selected, and the cropped image is provided to the selected transformation classification machine learning model 514. Specifically, a transformation classification machine learning model 514 specifically corresponding to (e.g., trained to generate a probability for) the object transformation described by the transformation record data entity 504 as being associated with the object depicted by the cropped image is selected. Thus, selection of a specific transformation classification machine learning model 514 advantageously reduces processing time and resources spent generating probabilities for unrelated or irrelevant transformations being present, while retraining the higher accuracy of a specifically-trained transformation classification machine learning model 514.

Generally then, one or more transformation classification machine learning models 514 are trained via labelled images to generate probabilities of transformations being captured by an image. In various embodiments, the transformation classification machine learning model comprises a convolutional neural network (CNN) model (e.g., a VGG16 CNN architecture) and/or any other suitable classification mechanisms or algorithms.

The one or more probabilities generated by the one or more transformation classification machine learning models 514 are then used to determine a transformation state of the object depicted by the cropped image. In various embodiments, the one or more probabilities are compared to a probability threshold for the object transformation described by the transformation record data entity 504 as being associated with the object depicted by the cropped image (e.g., the relevant object transformation). Thus, in embodiments involving a multi-class transformation classification machine learning model 514, one probability associated with the relevant object transformation is compared to the probability threshold. In other embodiments involving selection of a transformation classification machine learning model 514 specific to the relevant object transformation, the one generated probability is compared to the probability threshold.

According to the probability threshold, a pre-transformation state for the relevant object transformation or a post-transformation state for the relevant object transformation is determined. For example, if the probability threshold is satisfied (e.g., the probability of the relevant object transformation being present is higher than the probability threshold), then the object in the cropped image is determined to be in a post-transformation state of the relevant object transformation. Otherwise, if the probability threshold is not satisfied (e.g., the probability of the relevant object transformation being present is low), then the object in the cropped image is determined to be in a pre-transformation state of the relevant object transformation.

Thus, using one or more transformation classification machine learning models 514 and probabilities generated by the same, a transformation state is determined for each object depicted by the image set 502. Returning to FIG. 4, process 400 further comprises step/operation 404, which comprises determining a sufficiency measure for the image set based at least in part on comparing the transformation for each object identifier and the transformation state for one or more related objects associated with the object identifier. Again, a related object associated with the object identifier is an object depicted by the image set 502 for which the object identification machine learning model 512 generated a predicted object identifier substantially similar to the object identifier.

In various embodiments, the sufficiency measure for the image set is determined based at least in part on an object state log data entity 506 generated and updated based at least in part on comparing the transformation for each object identifier and the transformation state for the related objects associated with the object identifier. As shown in FIG. 5, the log generation module 510 generates and updates the object state log data entity 506 based at least in part on output of the one or more transformation classification machine learning models 514 (e.g., the transformation state for each object).

FIG. 6 illustrates an example object state log data entity 506. In the illustrated embodiment, the object state log data entity 506 is in the form of a table, chart, and/or the like and is configured to describe, for each object identifier described by the transformation record data entity 504 (e.g., described by the "Object Identifier" column), whether at least one related object for the object identifier is associated with a pre-transformation state of the transformation that is associated with the object identifier (e.g., described by the "Pre-Transformation" column) and whether at least one related object for the object identifier is associated with a post-transformation state of the transformation that is associated with the object identifier (e.g., described by the "Post-Transformation" column). In the illustrated embodiment, for example, "Present" in the "Pre-Transformation" column indicates that at least on image of the image set 502 depicts a related object for the object identifier in a pre-transformation state of the transformation associated with the object identifier. Conversely, "NOT FOUND" in the "Pre-Transformation" column indicates that no related object for the object identifier throughout the image set 502 is in the pre-transformation state of the transformation associated with the object identifier.

In various embodiments, the object state log data entity 506 is first generated to list the one or more objects described by the transformation record data entity 504. In the illustrated embodiments, for example, the object state log data entity 506 lists four objects identified by object identifier #1, object identifier #2, object identifier #3, and object identifier #4. In some embodiments, the object state log data entity 506 is generated to indicate that each object is not depicted in a pre-transformation state nor a post-transformation state. For example, the object state log data entity 506 defaults to "NOT FOUND" for both pre-transformation state and post-transformation state for each object identifier.

Upon determination of a transformation state for an object using the one or more transformation classification machine learning models 514, the object state log data entity 506 is updated. When an object is determined to be in a pre-transformation state of its associated object transformation (e.g., by a probability threshold not being satisfied), the object state log data entity 506 is updated to indicate that the object has been depicted in a pre-transformation state (e.g., "Present" under the column "Pre-Transformation"). Likewise, when an object is determined to be in a post-transformation state of its associated object transformation, the object state log data entity 506 is updated to indicate that the object has been depicted in a post-transformation state (e.g., "Present" under the column "Post-Transformation").

Overall then, each cropped image provided to the one or more transformation classification machine learning models 514 results in the object state log data entity 506 being updated, as an object described by the transformation record data entity 504 has been identified, by nature of providing the cropped image. The one or more transformation classification machine learning models 514 continue to analyze cropped images depicting objects described by the transformation record data entity 504, until each depiction of the objects throughout the image set has been evaluated. Accordingly, the object state log data entity 506 is comprehensively updated for each depiction and then describes the sufficiency measure for the image set 502. This dynamic updating of the object state log data entity 506 therefore determines a sufficiency measure for the image set 502.

In the illustrated embodiment, for example, the object state log data entity 506 describes that the image set 502 is insufficient, specifically with regards to a missing depiction of object #1 in a pre-transformation state of its associated object transformation and a missing depiction of object #4 in a post-transformation state of its associated object transformation. However, in the illustrated embodiments, the object state log data entity 506 describes that objects #2 and #3 and their associated object transformations are sufficiently captured. In various embodiments, determining a sufficiency measure for the image set comprises analyzing or processing the object state log data entity 506 once completely generated and updated.

Returning to FIG. 4, process 400 comprises step/operation 405, which comprises performing one or more automated sufficiency-based actions based at least in part on the sufficiency measure. In various embodiments, the one or more automated sufficiency-based actions are performed responsive to analyzing or processing the object state log data entity 506. That is, the sufficiency measure is determined based at least in part on the object state log data entity 506. For example, a sufficiency-based action of requesting a supplemental image is performed based at least in part on the sufficiency measure for the image set indicating that the image set is insufficient. Other automated sufficiency-based actions are performed upon determination that the image set is fully sufficient, or sufficiently captures each object and associated transformation described by the transformation record data entity 504.

In FIG. 5, the block diagram 500 illustrates the object state log data entity 506 being generated by the log generation module 510 and being provided to the log analyzer module 520. In various embodiments, the log analyzer module 520 of the system computing entity 106 is configured to receive the object state log data entity 506 (e.g., retrieve from memories 210, 215), determine a sufficiency measure for the image set 502 based at least in part on analyzing or processing the object state log data entity 506, and perform one or more automated sufficiency-based actions responsive to the analyzing or processing of the object state log data entity 506 (e.g., the sufficiency measure).

Turning now to FIG. 7, a process 700 for performing one or more automated sufficiency-based actions is illustrated. In various embodiments, the system computing entity 106 comprises means, such as one or more processing elements 205, memories 210, 215, network interface 220, and/or the like for performing steps/operations of process 700 to perform one or more automated sufficiency-based actions. Thus, in some example embodiments, process 700 is an example embodiment of step/operation 405.

Process 700 describes analyzing the object state log data entity 506 and in one embodiment, begins with step/operation 701, which involves determining whether an object is depicted in a pre-transformation state of its associated object transformation. Using the object state log data entity 506, for example, an object may be referenced (e.g., via the "Object Identifier" column), and the object state log data entity 506 may be traversed to determine whether the object has been depicted at least once in a pre-transformation state of its associated object transformation (e.g., via the "Pre-Transformation" column).

Responsive to determining that the object has not been depicted in a pre-transformation state by the image set 502, step/operation 702 is automatically performed. Step/operation 702 describes the automated sufficiency-based action of generating and transmitting a request for a supplemental image depicting the object in the pre-transformation state of its associated transformation. In various embodiments, the request identifies the object (e.g., via the object identifier) and identifies its associated transformation (e.g., a particular dental procedure). In various embodiments, the request is transmitted to the client computing entity 102 that previously provided the image set 502 and the transformation record data entity 504.

The process 700 further comprises step/operation 703 for determining whether the object is depicted in a post-transformation state of its associated object transformation. In some embodiments, step/operation 703 may be performed in parallel with step/operation 701 and/or agnostic to the determination made in step/operation 701. Similar to step/operation 701, step/operation 703 involves referencing the subject within the object state log data entity 506 and traversing the object state log data entity 506 to determine whether the object has been depicted at least once in a post-transformation state of its associated object transformation (e.g., via the "Post-Transformation" column).

Responsive to determining that the object has not been depicted in a post-transformation state by the image set 502, step/operation 704 is automatically performed. Step/operation 704 describes the automated sufficiency-based action of generating and transmitting a request for a supplemental image depicting the object in the post-transformation state of its associated transformation. In various embodiments, the request identifies the object (e.g., via the object identifier) and identifies its associated transformation (e.g., a particular dental procedure). In various embodiments, the request is transmitted to the client computing entity 102 that previously provided the image set 502 and the transformation record data entity 504.

The process 700 further comprises step/operation 705, which comprises determining whether the object state log data entity 506 identifies more objects. Responsive to determining that more objects are identified and have not been analyzed, process 700 returns to step/operation 701. That is, at least steps/operations 701-704 are performed for each object identified by the object state log data entity 506. In various embodiments, multiple requests for different objects in different transformation states are aggregated into a single request that is generated and transmitted. In the illustrated embodiment, for example, one request requesting a first supplemental image depicting object #1 in a pre-transformation state and a second supplemental image depicting object #4 in a post-transformation state is automatically generated and transmitted. Thus, a request may identify one or more objects and one or more transformation states to be depicted, in some embodiments.

Otherwise, if all objects identified by the object state log data entity 506 have been evaluated, process 700 may conclude with step/operation 706 for performing additional sufficiency actions, in some instances. Specifically, sufficiency actions are performed responsive to determining that the image set 502 is fully sufficient. In one example application, a sufficiency action that is automatically performed responsive to determining that an image set 502 comprising dental X-ray images is sufficient with respect to an associated dental claim involves approving the associated dental claim and further providing the associated dental claim to other systems for further processing (e.g., approval, manual review, automatic payment execution). In various embodiments, performing one or more sufficiency actions comprises generating and transmitting a notification to the client computing entity 102 that the image set 502 is sufficient with respect to the associated transformation record data entity 504.

Other examples of automated sufficiency-based actions include generating one or more notifications (e.g., one or more physician notifications, one or more claim reviewer notifications, and/or the like) based at least in part on the transformation record data entity 504 and/or the image set 502, one or more alerts (e.g., one or more physician alerts, one or more claim reviewer alerts, and/or the like) based at least in part on the transformation record data entity 504 and/or the image set 502, automatically scheduling one or more appointments based at least in part on the transformation record data entity 504 and/or the image set 502, automatically generating one or more prescriptions based at least in part on the transformation record data entity 504 and/or the image set 502, automatically generating one or more work orders based at least in part on the transformation record data entity 504 and/or the image set 502, and/or the like.

Thus, various embodiments of the present disclosure provide various technical advantages to technical challenges. In particular, various embodiments train and use machine learning models in order to accurately and efficiently identify objects depicted by the image set and to accurately and efficiently determine transformation states for the objects. Further, various embodiments enable the automated identification of objects, reducing time and resources spent for manual identification of objects and manual determination of transformation states. Automation of such tasks reduce network bandwidth and traffic, time, and processing resources spent on determining and communicating sufficiency measures for image sets.

Accordingly, as discussed above, various embodiments of the present invention address technical challenges related to improving efficiency of distributed record keeping systems. Many distributed record keeping systems require a first set of computing entities to provide specific records to a second set of computing entities. In such distributed record keeping systems, transmission of non-compliant and/or insufficient data records can cause substantial waste of network resources and processing resources. For example, in one scenario, a recipient computing entity may then transmit non-compliant data to other computing entities, and/or use the non-compliant data as part of complex processing tasks, all of which will lead to inefficient and unreliable use of system resources. By providing techniques for more reliable detection of non-compliant and/or insufficient data records, various embodiments of the present invention address technical challenges related to improving efficiency of distributed record keeping systems and make important technical contributions to the fields of distributed data processing and distributed computing.

VI. Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computer-implemented method comprising:
   receiving, by one or more processors, a transformation record data entity and an image set comprising a plurality of images, wherein the transformation record data entity describes a transformation of an object of a plurality of objects that is (a) associated with an object identifier and (b) depicted by the plurality of images;
   determining, by the one or more processors, based at least in part on the transformation record data entity and the image set, and by using an object identification machine learning model, the plurality of objects that is (i) depicted by the image set and (ii) associated with the object identifier;
   determining, by the one or more processors and using one or more transformation classification machine learning models, (i) a first absent depiction of the object in a pre-transformation state of the transformation and (ii) a second absent depiction of the object in a post-transformation state of the transformation;
   determining, by the one or more processors, a sufficiency measure for the image set based at least in part on the first absent depiction and the second absent depiction; and
   performing, by the one or more processors, one or more automated sufficiency-based actions based at least in part on the sufficiency measure, wherein the one or more automated sufficiency-based actions comprise:
   (i) responsive to the first absent depiction, generating and transmitting a request for a first supplemental image that depicts the pre-transformation state and
   (ii) responsive to the second absent depiction, generating and transmitting a request for a second supplemental image that depicts the post-transformation state.

2. The computer-implemented method of claim 1, wherein determining the sufficiency measure further comprises:
   generating an object state log data entity that is configured to indicate, for the object identifier, (i) whether a first image of the image set is associated with the pre-transformation state of the transformation, and (ii) whether a second image of the image set is associated with a post-transformation state of the transformation; and determining the sufficiency measure based at least in part on the object state log data entity.

3. The computer-implemented method of claim 1, wherein the object identification machine learning model is configured to determine a predicted object identifier for a determined object and a bounding box for the determined object, and wherein the bounding box for the determined object is configured to indicate a portion of an image in the image set that is estimated to depict the object identifier for the determined object.

4. The computer-implemented method of claim 3 further comprising mapping the determined object to the object identifier based at least in part on the predicted object identifier.

5. The computer-implemented method of claim 3, wherein the one or more transformation classification machine learning models are configured to determine the pre-transformation state or the post-transformation state based at least in part on the image and the bounding box.

6. The computer-implemented method of claim 1, wherein the one or more transformation classification machine learning models are associated with the transformation and are configured to output a probability of whether the transformation is present in an input image.

7. The computer-implemented method of claim 1, wherein the one or more transformation classification machine learning models comprise a multi-class transformation classification machine learning model that is configured to output one or more probabilities of whether the transformation is present in an input image.

8. The computer-implemented method of claim 1, wherein the plurality of images depicts at least a specific portion of a patient that a procedure was performed on.

9. A system comprising one or more processors; and
at least one memory storing processor-executable instructions that, when collectively or independently executed by any one or more of the one or more processors, comprise causing the one or more processors to perform operations comprising:

receiving a transformation record data entity and an image set comprising a plurality of images, wherein the transformation record data entity describes a transformation of an object of a plurality of objects that is (a) associated with an object identifier and (b) depicted by the plurality of images;

determining, based at least in part on the transformation record data entity and the image set, and by using an object identification machine learning model, the plurality of objects that is (i) depicted by the image set and (ii) associated with the object identifier;

determining, using one or more transformation classification machine learning models, (i) a first absent depiction of the object in a pre-transformation state of the transformation and (ii) a second absent depiction of the object in a post-transformation state of the transformation;

determining a sufficiency measure for the image set based at least in part on the first absent depiction and the second absent depiction; and performing one or more automated sufficiency-based actions based at least in part on the sufficiency measure, wherein the one or more automated sufficiency-based actions comprise:

(i) responsive to the first absent depiction, generating and transmitting a request for a first supplemental image that depicts the pre-transformation state and (ii) responsive to the second absent depiction, generating and transmitting a request for a second supplemental image that depicts the post-transformation state.

10. The system of claim 9, wherein determining the sufficiency measure further comprises:

generating an object state log data entity that is configured to indicate, for the object identifier, (i) whether a first image of the image set is associated with the pre-transformation state of the transformation, and (ii) whether a second image of the image set is associated with a post-transformation state of the transformation; and determining the sufficiency measure based at least in part on the object state log data entity.

11. The system of claim 9, wherein the object identification machine learning model is configured to determine a predicted object identifier for a determined object and a bounding box for the determined object, and wherein the bounding box for the determined object is configured to indicate a portion of an image in the image set that is estimated to depict the object identifier for the determined object.

12. The system of claim 11, wherein the one or more processors are further configured to map operations further comprise mapping the determined object to the object identifier based at least in part on the predicted object identifier.

13. The system of claim 9, wherein the transformation classification machine learning models are associated with the transformation and are configured to output a probability of whether the transformation is present in an input image.

14. The system of claim 9, wherein the one or more transformation classification machine learning models comprise a multi-class transformation classification machine learning model that is configured to output one or more probabilities of whether the transformation is present in an input image.

15. One or more non-transitory computer-readable storage media including instructions that, when executed by one or more processors, cause the one or more processors to perform operations comprising:

receiving a transformation record data entity and an image set comprising a plurality of images, wherein the transformation record data entity describes a transformation of an object of a plurality of objects that is (a) associated with an object identifier and (b) depicted by the plurality of images;

determining, based at least in part on the transformation record data entity and the image set, and by using an object identification machine learning model, the plurality of objects that is (i) depicted by the image set and (ii) associated with the object identifier;

determining, using one or more transformation classification machine learning models, (i) a first absent depiction of the object in a pre-transformation state of the transformation and (ii) a second absent depiction of the object in a post-transformation state of the transformation;

determining a sufficiency measure for the image set based at least in part on the state absent depiction and the second absent depiction; and performing one or more automated sufficiency-based actions based at least in part on the sufficiency measure, wherein the one or more automated sufficiency-based actions comprise:
(i) responsive to the first absent depiction, generating and transmitting a request for a first supplemental image that depicts the pre-transformation state and
ii) responsive to the second absent depiction, generating and transmitting a request for a second supplemental image that depicts the post-transformation state.

* * * * *

UNITED STATES PATENT AND TRADEMARK OFFICE
CERTIFICATE OF CORRECTION

PATENT NO. : 12,347,084 B2
APPLICATION NO. : 17/482031
DATED : July 1, 2025
INVENTOR(S) : Gregory Buckley et al.

Page 1 of 1

It is certified that error appears in the above-identified patent and that said Letters Patent is hereby corrected as shown below:

In the Claims

In Column 26, Lines 30-31, Claim 12, delete "one or more processors are further configured to map operations" and insert -- operations --, therefor.

In Column 26, Line 34, Claim 13, delete "wherein the" and insert -- wherein the one or more --, therefor.

In Column 26, Line 66, Claim 15, delete "state absent" and insert -- first absent --, therefor.

In Column 27, Line 8, Claim 15, delete "ii)" and insert -- (ii) --, therefor.

Signed and Sealed this
Twenty-third Day of September, 2025

John A. Squires
*Director of the United States Patent and Trademark Office*